United States Patent [19]

Knowles

[11] Patent Number: 5,019,714
[45] Date of Patent: May 28, 1991

[54] SCANNING SYSTEM WITH ARRAY OF LASER SCANNER MODULES TO PRODUCE COMPLEX SCAN PATTERN

[75] Inventor: Carl H. Knowles, Moorestown, N.J.

[73] Assignee: Metrologic Instruments, Inc., Bellmawr, N.J.

[21] Appl. No.: 307,032

[22] Filed: Feb. 6, 1989

[51] Int. Cl.[5] .............................................. G06K 7/14
[52] U.S. Cl. ..................................... 250/568; 235/467
[58] Field of Search ....................... 250/566, 568, 561; 235/462, 463, 465, 466, 467; 219/121.76, 121.8; 356/386, 387

[56] References Cited

U.S. PATENT DOCUMENTS

| | | |
|---|---|---|
| 3,902,048 | 8/1975 | Fleischer et al. ............ 235/61.11 E |
| 3,928,759 | 12/1975 | Sansone .................................. 250/568 |
| 3,988,573 | 10/1976 | Hayosh et al. ............... 235/61.11 E |
| 3,995,166 | 11/1976 | Hobart et al. ......................... 250/566 |
| 4,006,343 | 2/1977 | Izura et al. .................... 235/61.11 E |
| 4,093,865 | 6/1978 | Nickl .................................... 250/566 |
| 4,097,729 | 6/1978 | Seligman et al. ................... 235/467 |
| 4,122,525 | 10/1978 | Eaton ................................... 250/561 |
| 4,713,532 | 12/1987 | Knowles ............................... 235/467 |

Primary Examiner—Edward P. Westin
Assistant Examiner—George C. Beck
Attorney, Agent, or Firm—Caesar, Rivise, Bernstein, Cohen & Pokotilow, Ltd.

[57] ABSTRACT

A laser scanner system for producing and projecting a multi-line scanning pattern into a space in which a bar code is to be brought. The system includes plural modular laser scanners, each producing a line scan pattern, but mounted with respect to one another so that the pattern of each scanner is projected into the space to conjoin to form the multi-line pattern. Each module is arranged to receive light reflected off the object to convert that light into electrical output signals indicative of the bars and spaces of the code. The system also include means for decoding the output signals and for providing the decoded signals to some peripheral device, e.g., an electronic cash register or computer. In one embodiment the scanner is located adjacent a conveyor carrying bar coded items to form an automated check-out counter.

14 Claims, 2 Drawing Sheets

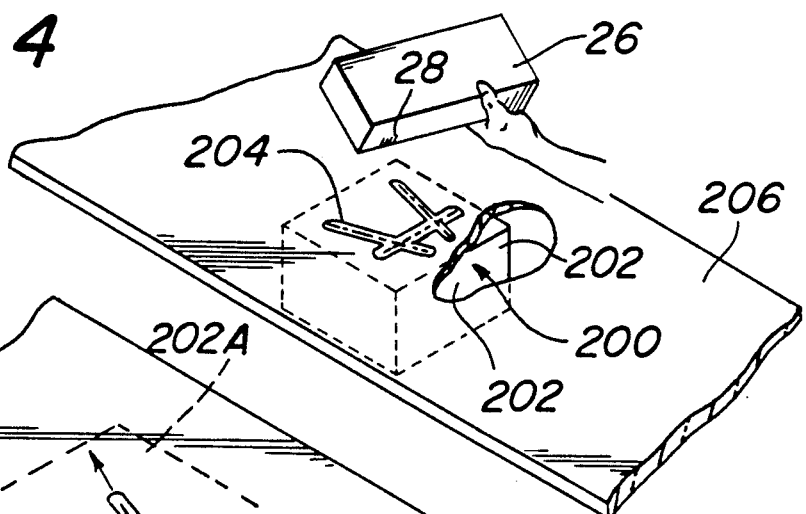
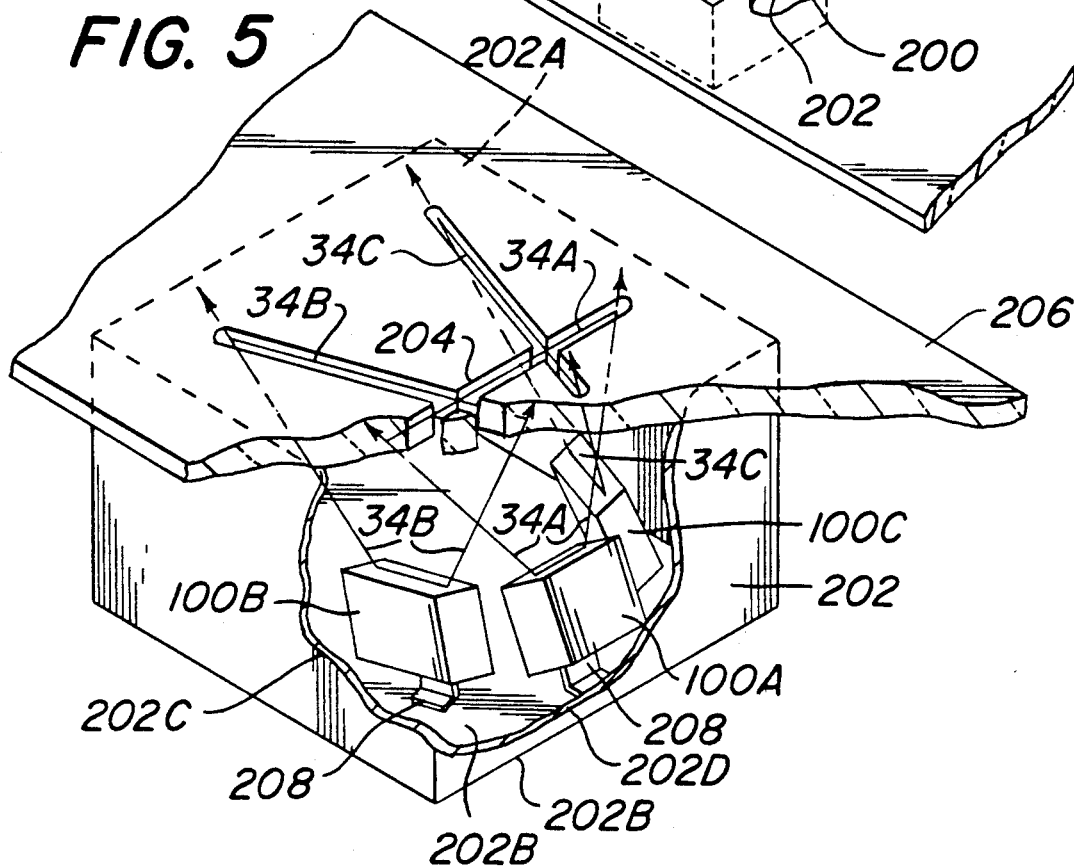
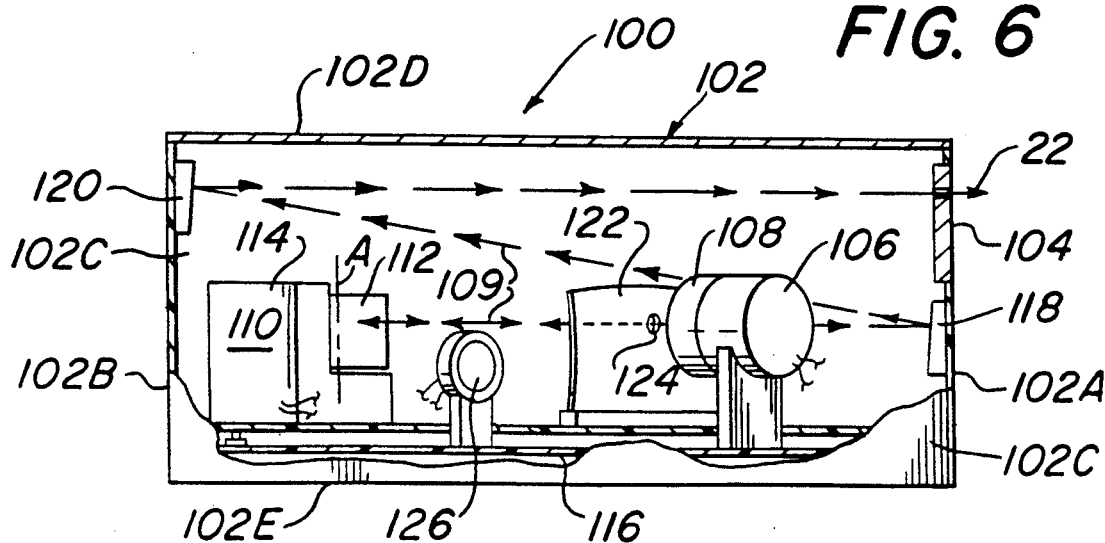

SCANNING SYSTEM WITH ARRAY OF LASER SCANNER MODULES TO PRODUCE COMPLEX SCAN PATTERN

BACKGROUND OF THE INVENTION

This invention relates generally to laser scanning apparatus or systems and more particularly to counter mounted laser scanning apparatus or systems.

As is known laser scanners of the type used at check-out counters of retail establishments are generally of one of two types. One type is the so-called hand-held scanner. That type of scanner is a portable device arranged to be held in one's hand to aim a line of laser light at the symbol, e.g., bar code, to be read. The scanner is typically connected to an electronic cash register or computer to process the information read, e.g., record the item and price and total sale. Due to their mode of operation, e.g., the necessity to aim the device at a symbol and then actuate a button or trigger to produce the laser beam to read the symbol, hand-held scanner systems are usually limited to relatively low volume applications. For high volume scanning applications, e.g., supermarket check-out counters, where a large number of items have to be scanned quickly, stationary counter-mounted scanners are employed. Such scanners are commonly referred to as slot scanners and are mounted within a housing under the checkout counter. The housing typically includes a window at the top through which a laser beam scanning pattern is projected. The scanning pattern typically consists of plural scan lines which are either parallel to one another and/or intersect one another.

The use of a multi-line scan pattern is dictated, at least in part, by the desire to be able to read the bar code omnidirectionally, i.e., read the bar code irrespective of the orientation of the symbol with respect to the scanner. One common way of producing multi-line scanning patterns in slot scanners is by directing a laser beam onto a rotating polygonal mirror. The rotation of each mirror face has the effect of sweeping the beam directed at it through a predetermined arc, thereby creating a linear scan pattern. The swept beam is then directed to various reflecting surfaces, e.g., mirrors, which are oriented at various angles and positions with respect to one another to convert the single line pattern into the multi-line pattern and to project that pattern out of the window into the space above the window. Hence a bar code held above the window and within the pattern can be read irrespective of the orientation of the bar code.

Examples of prior art slot scanners are found in the following U.S. Pat. Nos.: 3,902,048 (Fleischer et al), 3,928,759 (Sansone), 3,988,573 (Hayosh), 3,995,166 (Hobart), 4,006,343 (Izura et al), 4,093,865 (Nickl), and 4,097,729 (Seligman et al). All of the foregoing slot scanners are of substantial size and complexity of construction. Moreover, the construction of such scanners renders them not particularly suited for automated check-out operations, e.g., operations wherein the items to be scanned are carried by some conveyor means past the scanner for reading and entry of the information into the cash register.

In my U.S. Pat. No. 4,713,532, entitled Compact Omnidirectional Laser Scanner, which is assigned to the same assignee as this invention and whose disclosure is incorporated by reference herein, there is disclosed a counter or slot scanner which overcomes many of the size and complexity disadvantages of the prior art slot scanners. To that end the scanner of my aforenoted patent produces a rich multi-line scan pattern to effect the omnidirectional scanning of bar codes with components which are housed in a very compact and small footprint enclosure. This feature enables the scanner to be used in applications where space either below or above the counter is at a premium. Notwithstanding the advanced features of that scanner it still leaves something to be desired from the standpoint of ease of construction, assembly and suitablity for use in an automated check-out counter.

In my copending U.S. Pat. application Ser. No. 07/07/299,998, filed on Jan. 23, 1989, entitled Laser Scanner Engine with Folded Beam Path, which is assigned to the same assignee as this invention and whose disclosure is incorporated by reference herein, there is disclosed and claimed a modular scanner ("engine") which is extremely compact in size and suitable for use in various types of scanning systems.

OBJECTS OF THE INVENTION

Accordingly, it is a general object of this invention to provide a fixed position, laser scanning system which overcomes many of the disadvantages of the prior art.

It is a further object of this invention to provide a fixed position, laser scanning system suitable for automatic check-out applications.

It is a further object of this invention to provide a fixed position laser scanning system producing a multi-line scanning pattern for omnidirectional scanning by the utilization of a plurality of modular scanners, all located within a small enclosure.

It is a yet a further object of this invention to provide a fixed position laser scanning system producing a complex scanning pattern which is readily adaptable for various scanning applications.

It is still a further object of this invention to provide a fixed position laser scanning system producing a complex scanning pattern by utilizing a plurality of modular scanners constructed in accordance with the teachings of my aforementioned patent application.

SUMMARY OF THE INVENTION

These and other objects of the instant invention are achieved by providing a laser scanning system for projecting a laser scan pattern into a predetermined space. The pattern is made up of a plurality of lines which may or may not intersect one another. The system comprises a plurality of laser scanner modules which are mounted at predetermined orientations with respect to one another by support means. Each scanner module comprises a housing including a window, beam sweeping means for sweeping a laser beam from a predetermined point within the housing through a predetermined angle to produce a scan pattern comprising at least one line, and beam folding means projecting the scan pattern out of said window. Each module also includes signal processing means for producing electrical output signals indicative of the symbol scanned. The system also comprises decoder means for decoding the electrical output signals.

In one embodiment the scanner is in located adjacent a conveyor to enable the automated scanning of bar coded items which are disposed on the conveyor.

DESCRIPTION OF THE DRAWING

FIG. 4. is a perspective view of a slot scanner constructed in accordance with an alternative embodiment of this invention;

FIG. 5. is an enlarged perspective view partially in section of the embodiment shown in FIG. 4; and FIG. 6 is a side elevational view, partially in section, of one of the identical scanner engines utilized in the embodiments of FIGS. 1 and 4.

DETAILED DESCRIPTION OF THE PREFERRED EMBODIMENT

Figure 1:
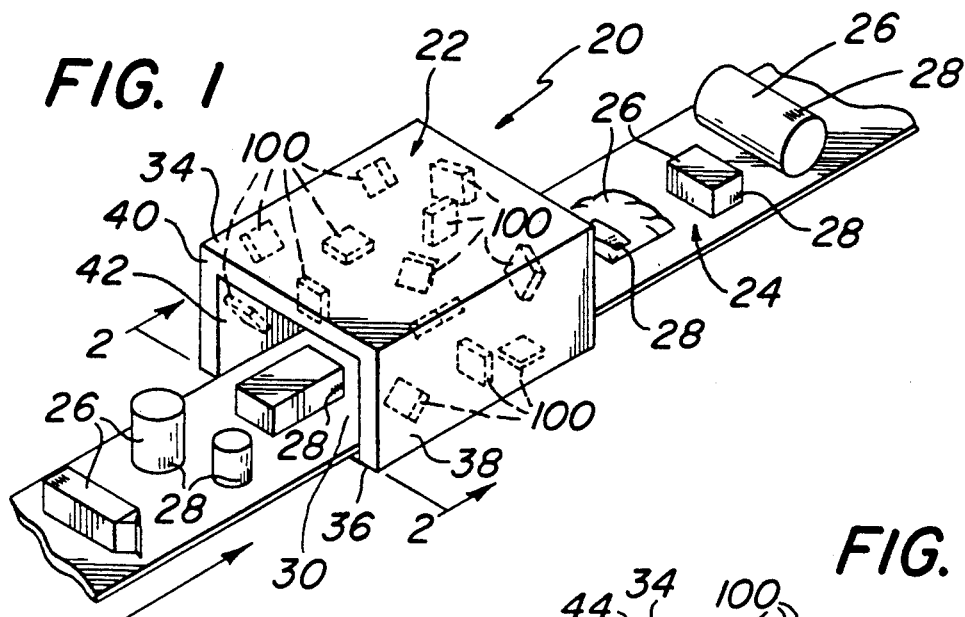
FIG. 1 is a perspective view of an automated scanner system constructed in accordance with one embodiment of the subject invention.

Referring now to various figures of the drawing wherein like reference characters refer to like parts there is shown in FIG. 1 one embodiment of a scanner system 20 constructed in accordance with this invention. The system 20 forms a portion of an automated check out counter for a business, e.g., supermarket or other retail store. The system 20 basically comprises a housing 22 arranged to be disposed adjacent a counter mounted-conveyor 24 on which items or products 26 bearing bar codes, e.g., the UPC code, 28 are transported at the checkout counter, such as at a supermarket. In the embodiment shown herein, and which is merely exemplary, the housing is in the form of a tunnel having a central space 30 through which the products 26 are conveyed for scanning their bar codes. The tunnel is disposed on the checkout counter over the conveyor. The scanning of the bar coded items is effected by a plurality of scanner modules or engines 100 which are mounted within the tunnel at various locations surrounding the space 30. Each scanner module 100 is constructed in accordance with the teachings of my aforenoted patent application and will be described in detail later. Suffice it for now to state that each scanner module is constructed and arranged to produce a single line laser scan pattern and to project it into a space in which a bar code to be scanned (read) is brought. The plural modules 100 are mounted within the housing, each oriented in a different direction with respect to the others, so that the line pattern produced by each of the modules conjoin (e.g., intersect or extend parallel to each other) to the line patterns produced by the others to form a complex, multi-line scanning pattern 32 (FIG. 2) which fills the space 30. Accordingly, any bar code brought into that space will be traversed by at least one of the scan lines projected by one of the scanner modules, irrespective of the orientation of the bar code with respect to the housing. This action ensures that true omnidirectional scanning occurs. The light reflected off the symbol traversed by any line pattern(s) from any module(s) is received back by the module(s) producing that line(s). The reflected light is converted in that module(s) into an electrical signal indicative of the bars and spaces in the symbol scanned. These signals are decoded by decoding means (to be described later) in the system 20 and which is coupled to all the scanner modules. Accordingly, the system is able to read the information contained in the bar code which is traversed by any one or more scan lines.

Since any bar code may, during its passage through the system be traversed by more than one scan line, the system's decoding means is arranged to decode (read) each bar code only once, irrespective of how many scan lines traverse it. As is conventional the system's decoding means is arranged to provide decoded signals to any desired peripheral device, e.g., an electronic cash register, computer, etc., (not shown) at the checkout counter.

Figure 2:
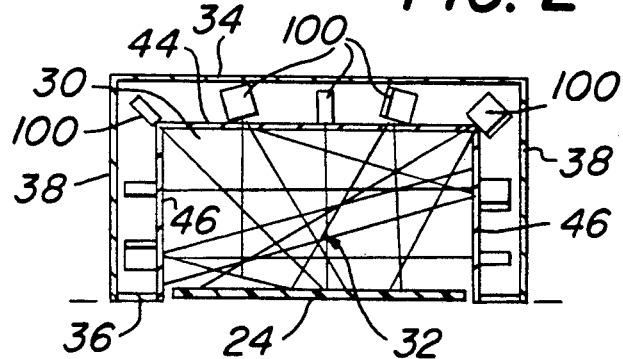
FIG. 2 is a sectional view taken along line 2—2 of FIG. 1.
Figure 3:
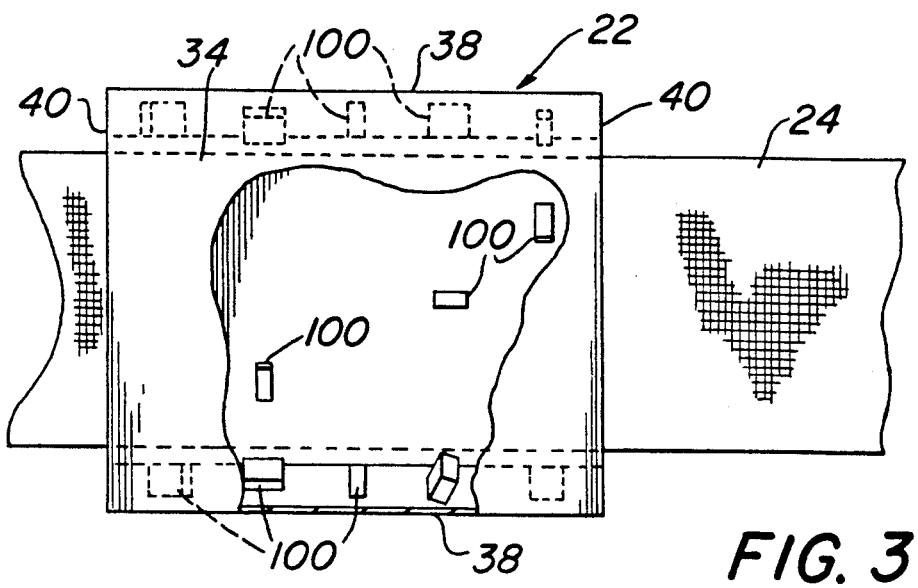
FIG. 3 is an enlarged top plan view, partially in section, of the embodiment of the scanner system shown in FIG. 1.

As can be seen in FIGS. 1 and 2 the tunnel is made up of an outer enclosure and an inner enclosure. The outer enclosure is formed by a top wall 34, a bottom wall 36, a pair of side walls 38, and a pair of end walls 40. The end walls 40 each include a central rectangular opening 42 through which the conveyor 24 with the products 26 carried thereon passes. The walls of the outer enclosure can be formed of any suitable material, e.g., metal, plastic, etc. The inner enclosure is in the formed by a top wall 44 and a pair of side walls 46 which extend the length of the housing and are joined to the outer enclosure's end walls 40 contiguous with the opening 42 therein. The plural scanner modules 100 are located in the space between the tunnel's outer and inner walls and are supported in their desired orientations by any suitable mounting means, e.g, brackets. The inner walls 44 and 46 of the tunnel are formed of a material which is transmissive to the wavelength of the laser light produced by the scanners 100 to enable their respective scan patterns to be projected into the space 32 and to enable the light reflected off of the symbols 28 which have been scanned by the laser light to be received back by the modules 100.

It must be pointed out at this juncture that the number and orientation of the plural scanner modules 100 shown in the embodiment 20 is merely for illustrative purposes only. Any number of scanners may be used and oriented to produce any desired multi-line pattern 32 within the space 30 through which the bar coded items are carried for scanning.

As described in my aforenoted application each scanner module or "engine" 100 is self-contained within a very compact, e.g., 1 inch by 1.5 inches by 0.75 inch, parallelopiped shaped enclosure 102. A typical scanner module 100 is shown in FIG. 6. As can be seen its enclosure includes a front wall 102A, a rear wall 102B, a pair of side walls 102C, a top wall 102D, and a bottom wall 102E. The front wall 102A of the module 100 includes a rectangularly shaped window 104 extending virtually the entire width of the enclosure 10 and located immediately adjacent its top wall 102D.

The laser light source and all of the associated optical, mechanical, and electrical components to produce the laser beam scanning pattern 22, to project it out of the window 104 onto a bar code (not shown), and to sense the light reflected off of the bar code to produce the digital output signals, are all located within the engine's enclosure 102. The components forming the laser, its focusing optics, and the electrical components forming the reflected light receiving means and associated signal processing circuitry are conventional, and hence, will only be described generally herein. Thus, the engine 100 comprises a conventional semiconductor laser diode 106 and associated optical means 108. The optical means 108 comprises a lens system, not shown, mounted on the front of the laser diode for focusing the beam produced by the diode into the desired spot size.

The focused beam, denoted by the reference numeral 109, is then directed to beam sweeping means 110 which serves to sweep the focused beam through a predetermined arc, about an axis A to produce a scan pattern 22 consisting of a single, straight line when projected onto a plane. The line pattern extends across substantially the entire width of the window 104.

The beam sweeping means 110 incorporated into the engine 110 constitutes yet another invention of mine, and is the subject of copending U.S. Pat. application Ser. No. 07/300,018, filed on Jan. 23, 1989, entitled Bouncing Oscillating Scanning Device for Laser Scanning Apparatus. That application is assigned to the same assignee as this invention and its disclosure is incorporated by reference herein. As disclosed in that application the beam sweeping means basically comprises light reflective means 112 (e.g., a mirror), a motor (not shown), and a support structure 114.

The motor is preferably an electromagnet which is coupled to the mirror 112 to oscillate it about the axis A through a predetermined arc, e.g., +/−7 degrees, to produce the desired line pattern. In the preferred embodiment the mirror is concave, but can be any other suitable shape, e.g., planar. The mirror 112 is mounted on a pivot arm (not shown) which is pivotally mounted on the support structure 114 at the location of the pivot axis A. The pivot arm includes a permanent magnet mounted at its free end. The electromagnet motor comprises an coil of electrically conductive wire forming a central bore in which the permanent magnet is located. The coil is arranged to be connected to current supply means (not shown) for providing electrical current pulses of opposite polarity to it to produce alternating direction electromagnetic fields. This action causes the magnet to be pulled and pushed into and out of the bore, thereby causing the arm to oscillate about axis A.

The amount of excursion of the magnet into and out of the bore, and hence the angle of the mirror's oscillation about axis A, is established by the use of a pair of adjustable elastic stops or bumpers (not shown). In order to energize the coil a series of respective very short duration current initiation pulses are produced by control means (not shown) each time that the pivot arm has reached the end of its particular excursion. Sensor means (not shown) are provided at each bumper and are coupled to the control means to initiate the production of the current initiation pulses.

The alternate energization of the coil coupled with the operation of the elastic bumpers (e.g., the bumpers stop the excursion of the arm in one direction and due to their resiliency impart a force to the arm in the opposite direction) results in the controlled oscillation of the mirror. By controlling or adjusting the pulse width and/or magnitude of the current pulses provided to the motor one can control or adjust the velocity of the movement of the mirror 112.

The beam sweeping means 110 is mounted on a wall portion of the enclosure at the same elevation as the laser diode and associated focusing means so that the focused beam 60 is projected horizontally onto the oscillating mirror 112. The means for mounting the laser diode and associated focusing means comprises a printed circuit card 116 which is mounted within the bottom portion of the engine.

The engine 100 includes a beam folding system located downstream of the beam sweeping means 110 to fold the path of the beam within the enclosure. In so doing the enclosure can be made very compact in size, as described earlier, while enabling the production of a wide, linear, scan pattern which can be used to scan large (wide) bar codes located close to the window as well as small (narrow) bar codes located far from the window, all without the need for complex signal processing and/or decoding means. To accomplish that end the beam folding system comprises a pair of reflecting surfaces, each in the form of an elongate mirror. In particular, a first mirror 118 is mounted on the interior surface of the enclosure's front wall at the same elevation as the oscillating mirror 112. The mirror 118 extends a substantial portion of the width of the front wall and includes a planar reflecting surface tilted upward at a slight acute angle, e.g., 4.8 degrees. Accordingly, the focused beam 109 is swept horizontally through the enclosure from an origin point (the point at which the focused beam impinges the oscillating mirror 112) to the upwardly angled reflecting surface of the mirror 118. The mirror 118 serves to reflect the swept beam (the line forming pattern 22) to another mirror 120 of the beam folding system. The mirror 120 is mounted on the inner surface of the enclosure's rear wall 102B at the same elevation as the window 104. The mirror 120 extends an even greater portion of the width of the enclosure than mirror 218 and includes a planar reflecting surface which is tilted downward at a slight acute angle, e.g., 4.8 degrees. Accordingly, the mirror 120 reflects the swept beam received from the mirror 118 horizontally through the enclosure to the window 104, from which it exits to sweep across any bar code located opposite the window.

The traversal of the laser beam across the bar code symbol illuminates the symbol, whereupon light is reflected omnidirectionally off of the symbol. A portion of the reflected light, representative of the bars and spaces of the code, enters the window 104. The received light passes through the enclosure onto mirror 120 where it is reflected downward across the enclosure to mirror 118. Mirror 118 in turn reflects the incoming light horizontally to the oscillating mirror 112, from whence it is directed horizontally to a collecting mirror 122. The collecting mirror 122 is mounted in the enclosure directly in front of the beam focusing means 108. Thus, the collecting mirror includes an opening 124 through which the focused laser beam 109 passes enroute to the beam sweeping mirror 112.

The collecting mirror 122 basically comprises a concave, e.g., spherical, parabolic, etc., reflective surface for focusing the received light onto a conventional light-to-electrical transducer, e.g., phototransistor, 126. The phototransistor 126 is also mounted on the circuit board 116 in the enclosure opposite to the collecting mirror 122. Accordingly, light received by the phototransistor is converted into an electrical signal indicative of the bars and spaces of the symbol scanned. The phototransistor is coupled to conventional signal processing means (not shown) including a preamplifier, amplifier, and digitizer circuitry mounted on the circuit board 116. That circuitry produces the heretofore mentioned digital output signals, and such signals are provided via a cable (not shown) to decoding means in the form of a microprocessor and associated logic circuitry (not shown) which are located in the tunnel 22.

It should be pointed out at this juncture that other types of laser beam generating devices can be used in lieu of the semiconductor laser diode described heretofore. Moreover, other beam sweeping means can be utilized to produce the scan pattern, and that pattern need not consist of only a single line.

Operation of the scanner system 20 at a check out counter of a supermarket or other retail business is as follows: with the system on, i.e., the scanner modules' producing their respective scan lines and the conveyor running, the customer places the bar coded items to be purchased on the conveyor upstream of the tunnel. The products are carried by the conveyor into the tunnel where the bar code of each product is scanned (as described earlier) and the decoded information provided to the associated electronic cash register (not shown). After the items exit the tunnel the customer can then remove them for packing (bagging).

As should be appreciated from the foregoing the system enables the automated scanning of a series of bar coded products, such as is presently accomplished manually at checkout counters. Obviously this offers significant advantages to retailers.

The ability to form an automated check out counter is only one of the advantages of the system 20 of this invention. In this connection it should also be appreciated that by the use of plural modular scanning components the system can be manufactured and assembled easily and at a relatively low cost. Moreover, the scanning system is quite compact and will not take up a significant portion of counter space. In addition since the system is disposed over the counter, that leaves the underside of the counter free. This later feature is significant for checkout applications where rules or regulations require an operator to be seated at the check-out counter.

In FIGS. 4 and 5 there is shown an alternative embodiment of a scanner system 200 of this invention. That embodiment is a counter or slot type of scanner. The scanner 200 is in the form of a compact housing or enclosure 202 having a top wall 202A, bottom wall 202B, a pair of side walls 202C and a pair of end walls 202D. The topwall includes three intersecting slots forming a window 204 through which the respective portions of the scan pattern produced by the scanner pass. The scanner is mounted below a conventional counter, such as a check out counter 206. Alternatively, the scanner could be placed on top of the counter 206, if desired. In any case the scanner 200 produces a scan pattern like that of the scanner of my aforementioned U.S. Pat. No. 4,713,532, but with more modular components. To that end the system 200 uses three scanning modules 100A, 100B, and 100C disposed within an enclosure or housing 202 in place of various components of my aforemention patent to produce the same three line scan pattern. Each module is constructed as described heretofore with reference to system 20.

As can be seen in FIG. 5 the scanner module 100A is mounted by a bracket means 208 in the housing so that it's window 104 extends transversly (side-to-side) of the housing 202 and is aimed upward. Thus, scanner 100A produces one transverse scan line 34A like that of my aforementioned patent. Module 100B is mounted by similar means 208 disposed laterally of the module 100A and is oriented so that it's window is at an angle to the horizontal and vertical axis of the housing so that its scan line 34B is like that of my aforementioned patent. Module 100C is also mounted by similar means 208 but is oriented at a mirror image angle to the horizontal and vertical axis of the housing as module 100B so that its scan line 34C is like that of my aforementioned patent.

Accordingly, when an item 26 bearing a bar code is held above the scanner 200 at least one of the lines 34A, 34B or 34C of the pattern will traverse the code whereupon the light reflected thereof will be received and processed by the signal processing and associated circuitry to effect the reading of the code.

As should thus be appreciated by those skilled in the art the system of the emboidment 200 produces the rich omnidirectional scan pattern of the scanner of my aforementioned patent with an extremely simple and very compact construction. Moreover, like the system 20, the use of the modular scanning components in system 200 enables the system to be assembled easily and quickly. This facilitates the initial manufacture of the scanner and its subsequent servicing, if necessary. Further still the modularity of the scanning components enables one to readily form any complex multi-line scanning pattern by the appropriate selection and mounting of the scanner modules with respect to each other. This later feature is an advantage of all of the systems of this invention and not only the embodiment shown in FIGS. 4 and 5.

Without further elaboration the foregoing will so fully illustrate my invention that others may, by applying current or future knowledge, readily adapt the same for use under various conditions of service.

I claim:

1. A scanning system for reading a bar code on an object, said system comprising plural laser scanner modules and support means therefor, said system producing a complex scan pattern and projecting it into a predetermined space, said pattern being formed of plural scan lines, each of said lines being produced by a respective one of said laser scanner modules, said modules being mounted by said support means at various angles to one another to project their respective scan lines into a predetermined space, whereupon said complex scan pattern is created within said space, each of said modules comprising a housing having a window, first means for producing a laser beam and sweeping said beam from a laser point within said housing through a predetermined angle to produce a line scan pattern which is projected out of said window, and second means receiving light reflected off of a bar code as it is traversed by said pattern within said predetermined space and for converting said reflected light into an electrical output signal indicative of said bar code.

2. The scanning system of claim 1 wherein said modules are electrically coupled to means for decoding said output signals.

3. The scanning system of claim 2 wherein each of said modules additionally comprises beam folding means for folding the path of said swept beam within said housing between said beam folding means and said window so that said housing is very compact.

4. The scanning system of claim 3 wherein said beam folding means comprising first and second reflecting means, one of said reflecting means being located adjacent said window and the other of said reflecting means disposed generally opposite thereto, said first means directing said beam to said one of said reflecting means, said one of said reflecting means directing said beam to the other of said reflecting means, said other of said reflecting means directing said beam to said window.

5. The scanning system of claim 4 wherein said beam sweeping means comprises a reflective member being arranged for reciprocating oscillation about an axis through said predetermined angle.

6. The scanning system of claim 5 wherein said angle is approximately 14 degrees.

7.

8. The scanning system of claim 1 wherein said support means comprises a tunnel in which said modules are mounted.

9. The scanning system of claim 7 wherein said counter includes conveyor means for carrying said object into said predetermined space.

10. The scanning system of claim 1 additionally comprising conveyor means for carrying an object bearing a bar code into said predetermined space for scanning.

11. The scanning system of claim 8 wherein said counter includes conveyor means for carrying said object into said predetermined space.

12. The scanning system of claim 1 wherein said support means comprises an enclosure adapted to be disposed at a counter.

13. The scanning system of claim 1 wherein said system comprises three laser scanner modules, one of said modules creating a transverse scan line, and the others of said modules each creating a respective side scan line, said side scan lines intersecting said transverse scan line.

14. The scanning system of claim 12 wherein said system comprises three modules, one of said modules creating a transverse scan line, and the others of said modules each creating a respective side scan line, said side scan lines intersecting said transverse scan line.

* * * * *